May 2, 1967 M. BECKER 3,317,581
HYDROCARBON OXIDATION PROCESS TO PRODUCE BORATE ESTER
Filed Jan. 17, 1964
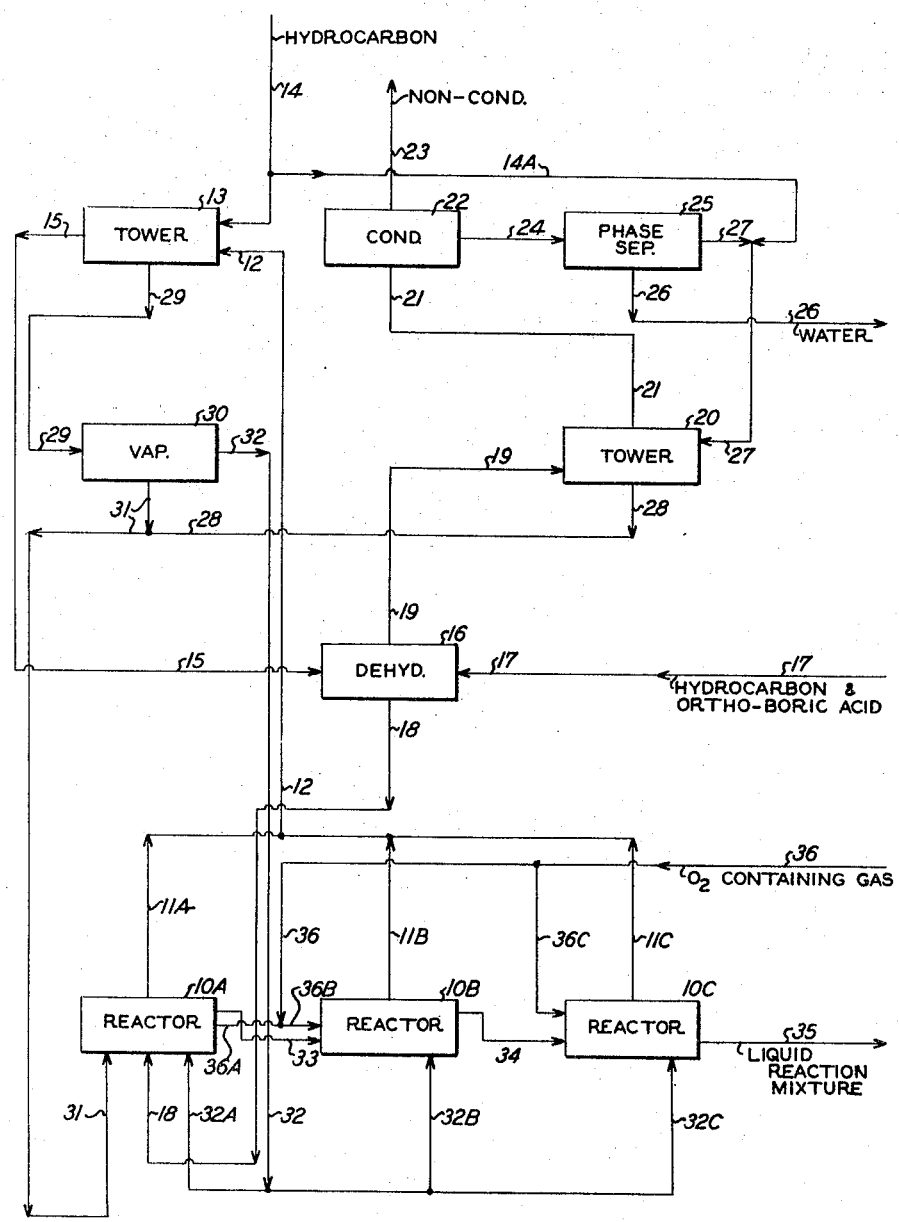
INVENTOR
MITCHELL BECKER
BY William C. Long
ATTORNEY United States Patent Office 3,317,581
Patented May 2, 1967

3,317,581
HYDROCARBON OXIDATION PROCESS TO PRODUCE BORATE ESTER
Mitchell Becker, Teaneck, N.J., assignor to Halcon International, Inc., a corporation of Delaware
Filed Jan. 17, 1964, Ser. No. 338,364
7 Claims. (Cl. 260—462)

This invention relates to processes for the liquid phase partial oxidation of hydrocarbons with a molecular oxygen containing gas, more particularly to such processes carried out in the presence of a lower hydrate of ortho-boric acid and especially to such a process wherein there is efficient use of heat for the reaction and for converting ortho-boric acid to meta-boric acid, which is passed to the oxidation reaction step, without fouling the system.

Processes for the liquid phase partial oxidation of hydrocarbons in the presence of a borate-ester forming material are commercially interesting.

Much heat is needed for the required hydrocarbon boil-up. At the termination of the oxidation reaction, the reaction mixture contains a substantial amount of alcohol in the form of a borate ester thereof. In order to recover the alcohol as such it is desirable to subject the oxidation reaction mixture to a hydrolysis whereby the alcohol liberated can readily be recovered by distillation, solvent extraction, or the like. The hydrolysis is readily accomplished for example, by adding water to the oxidation reaction mixture before or after hydrocarbon removal and optionally heating e.g., at 30° to 150° C. The boric acid residue is recovered from the reaction mixture as solid ortho-boric acid mixed with hydrocarbon and water, and preferably it is dehydrated to anhydrous meta-boric acid before re-use. Continuous azeotropic dehydration thereof requires a large boil-up of hydrocarbon, and this carries over with the vapor a significant amount of boron material, i.e. enough to deposit and clog heat exchange surfaces and reboilers. This requires plant shut-down and clean-out, which markedly reduces plant efficiency and results in boron losses.

The art is confronted with the problem of providing an efficient reaction and dehydration process which minimizes or avoids these disadvantages.

The discoveries associated with the invention and relating to the solution of the above problems, and the objects achieved in accordance with the invention as set forth herein include the provision of: the process which comprises subjecting a hydrocarbon to oxidation with molecular-oxygen containing gas in the presence of a lower hydrate of ortho-boric acid, removing vapors comprising hydrocarbon and water from the oxidation reaction mixture, directly contacting said vapors with a first liquid hydrocarbon feed thereby heating said liquid and cooling said vapors, subjecting said first heated hydrocarbon feed to further heating and introducing said first hydrocarbon into said oxidation reaction mixture, contacting said cooled vapors from said direct contact with a slurry of ortho-boric acid in said hydrocarbon thereby dehydrating the ortho-boric acid to meta-boric acid, feeding said meta-boric acid and hydrocarbon to said oxidation reaction mixture, removing vapors from the dehydration and contacting said vapors with a second liquid hydrocarbon feed, and passing said second hydrocarbon feed directly to said oxidation reaction mixture; such a process wherein the first hydrocarbon feed is subjected to heating up to about 185° C.; such a process wherein the dehydration is at about 150° C.; such a process wherein the second hydrocarbon feed is subjected to heating with the dehydration vapors at a temperature in the range of about 100° to 150° C.; such a process wherein the hydrocarbon is cycloalkane; such a process wherein the hydrocarbon is cyclohexane; such a process wherein the heat supplied to the reaction mixture by the feeds thereto is sufficient to carry forward the reaction with the requisite hydrocarbon and water boil-up; such a process wherein any non-hydrocarbon material present in the first hydrocarbon feed is in solution during the further heating thereof; such a process carried out in a plurality of reaction zones arranged in parallel as to the vaporized first hydrocarbon feed and the vapor draw-off, and arranged in series as to meta-boric acid and all liquid hydrocarbon feeds and the reaction mixture draw-off, the said acid and liquid hydrocarbon being fed to the first reactor, reaction mixture being passed from one reactor to the next reactor up to the last reactor in the series, and reaction mixture being drawn off from the said last reactor; such a process using three reactors; such a process wherein the second hydrocarbon feed is recovered from the dehydration vapors; such a process wherein the second hydrocarbon feed includes fresh hydrocarbon and it is subjected to heating with the dehydration vapors at a temperature in the range of about 100° to 150° C.; such a process wherein the proportion of fresh feed in each of the first and the second hydrocarbon feeds is adjusted to control the temperature of the vapor fed to the dehydration step; and other objects which will be apparent as details or embodiments of the invention are set forth hereinafter.

The accompanying drawing is a schematic flow diagram of one embodiment of the invention.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

*Example 1.*—Referring to the drawing, oxidation reactors 10A, 10B and 10C are connected in series and continuously receive feed from the previous reactor except for reactor 10A which receives feed from dehydrator 16, said feed containing 96 parts of cyclohexane and 4 parts of metaboric acid. The oxidizers are maintained at a temperature of about 330° F. or 165° C., and a pressure of 125 p.s.i.g. Air or $O_2$ containing gas is introduced into the reactors through lines 36 and 36A, 36B and 36C. About 8% of the cyclohexane reacts as the liquid reaction mixture is passed from reactor 10A via line 33 to reactor 10B and via line 34 to reactor 10C, and is then withdrawn via line 35.

The reaction mixture is hydrolyzed with water and solid ortho-boric acid (with water and organics) is separated (this feature not shown in drawing). This acid mixture and/or fresh ortho-boric acid and cyclohexane is passed via line 17 to dehydrator 16, wherein the acid is dehydrated to meta-boric acid, e.g. at 150° C., and a slurry of the latter in cyclohexane is passed via line 18 to reactor 10A.

The oil or filtrate from the hydrolyzed reaction mixture is processed to recover a cyclohexanol fraction, e.g. by distillation or equivalent manner.

The hydrocarbon and water vapors at 165° C. are passed from the reactors via lines 11A, 11B, 11C and 12 to tower 13, wherein they are cooled by contact with liquid cyclohexane fed via line 14. The vapors then pass via line 15 to dehydrator 16. Liquid from tower 13, heated to a temperature in the range of 150° C. to 165° C., is passed via line 29 to vaporizer 30, wherein it is heated further (e.g., up to about 185° C. via a steam coil, not shown) and some is vaporized. Cyclohexane vapor is passed therefrom via lines 32, 32A, 32B and 32C to reactors 10A, 10B and 10C. Hot liquid is passed therefrom via line 31 to reactor 10A. Where desirable, some of this liquid could be passed into oxidizers 10B and 10C (connections not shown).

Any boron material carried over with vapors from the reactors and present in the cyclohexane heated in vaporizer 30 is in solution and there is no deposition thereof in the vaporizer.

The hydrocarbon and water vapor from dehydrator 16 is passed via line 19 to tower 20, wherein it is cooled by contact with liquid and any liquid formed is separated. The upper part of this tower is preferably maintained at about 100° to 110° C. to avoid condensation of water. The vapor is passed via line 21 to condenser 22, wherein it is cooled, e.g. to about 40° C. and water and hydrocarbon are condensed, and passed via line 24 to separator 25. Non-condensible gas is removed via line 23. Water is separated and removed via line 26. Liquid hydrocarbon at 40° C. is passed via line 27 to tower 20. Optionally, some fresh hydrocarbon feed may be added thereto via line 14a.

In dehydrator 16, free water is vaporized. Heat is supplied thereto via hydrocarbon vapor introduced via line 15. The temperature is maintained at about 150° C. and the ortho-boric acid is dehydrated to meta-boric acid.

The liquid from tower 20 is passed via line 28 to line 31, for recycling to the reactors. This liquid contains a very significant amount of boron material, but is not subjected to the high heat (185° C.) in vaporizer 30, thereby preventing fouling of the vaporizer and related lines.

Heat is introduced into the reactors by means of hydrocarbon vapor supplied by lines 32, 32A, 32B and 32C. The liquid fed to these reactors is preheated, as already mentioned. The amount of hydrocarbon vapor fed is sufficient to maintain the reaction mixture at the temperature desired, as well as provide the desired boil-up. It also may provide heat for dehydrator 16 on start up.

In this way, efficient heat transfer is achieved without caking or coating on heat transfer surfaces. Where this is not desired, an indirect heater such as steam coil or jacket may be used in contact with the reaction mixture. The reaction mixture may be in the form of a slurry, some of the inorganic material being present as a solid.

In tower 20, the "wet" or "watery" hydrocarbon introduced via line 27 is heated and water is removed as vapor with some hydrocarbon (as described in U.S. Pat. 3,109,864) the vapor passed via line 21 is condensed in condenser 22 (non-condensibles removed via line 23) and the liquid is passed via line 24 to separator 25 wherein a lower water layer is separated, and removed via line 26. Dry hydrocarbon is removed from tower 20 via line 28.

*Comparative Example A*

The above procedure is repeated except that only one tower is used in place of towers 20 and 13, all the return liquid containing boric material is passed through vaporizer 30. Under the analogous operating conditions, there is significant fouling of the vaporizer in relatively short time, requiring plant shut-down and cleanout. The process of the invention avoids such fouling, permitting extended efficient plant operation.

The proportion of fresh feed fed via each of the two towers (13 and 20) may be adjusted, so as to control the desired heating of the dehydration system, e.g. 50% via each tower.

Comparable results to the foregoing are achieved with various modifications thereof including the following. A lower hydrate of ortho-boric acid is maintained in admixture with the reactants during the oxidation reaction. Preferred lower hydrates are meta-boric acid, tetra-boric acid, born oxide, or mixtures thereof.

Suitable reaction temperatures are broadly 75° to 300° C., desirably 100° to 200° C., and preferably 140° to 180° C. Suitable dehydration temperatures are desirably 100° to 160° C. and preferably 140° to 155° C. The dehydration process preferably is carried out continuously. Any boron material in the feed liquid subjected to the higher heating (e.g. up to about 185° C.) is in solution. The return liquid recovered from dehydration vapor is never heated enough to cause melting and deposition of boron material (e.g., not heated above about 150° C.) to avoid fouling of heat-exchange surfaces or flow-lines.

The process of this invention is applicable to processes for the oxidation of a wide variety of hydrocarbons. The invention is especially suitable in systems involving the oxidation of $C_4$ to $C_8$ saturated hydrocarbons both acyclic and cyclic such as butane, pentane, methyl butane, cyclopentane, cyclohexane, cycloheptane, cyclooctane, methylcyclopentane, methylcyclohexane, and the like.

In view of the foregoing disclosures, variations and modifications thereof will be apparent to one skilled in the art, and it is intended to include within the invention all such variations and modifications except as do not come within the scope of the appended claims.

What is claimed is:

1. The process which comprises subjecting a saturated hydrocarbon to oxidation at a temperature of 75° to 300° C. with molecular-oxygen containing gas in the presence of meta-boric acid to produce a borate ester containing reaction mixture, removing vapors comprising hydrocarbon and water from the oxidation reaction mixture, directly contacting said vapors with a first liquid feed stream of said hydrocarbon thereby heating said liquid and cooling said vapors, subjecting said first heated hydrocarbon feed stream to further heating up to 185° C. and introducing said first hydrocarbon feed stream into said oxidation reaction mixture, contacting said cooled vapors from said direct contact with a slurry of ortho-boric acid in said hydrocarbon thereby dehydrating the ortho-boric acid to meta-boric acid at a temperature of 100° to 160° C., feeding said meta-boric acid and hydrocarbon to said oxidation reaction mixture, removing vapors from the dehydration and contacting said vapors with a second liquid feed stream of said hydrocarbon, and passing said second hydrocarbon feed stream directly to said oxidation reaction mixture.

2. A process of claim 1 wherein the dehydration is at about 150° C.

3. A process of claim 2 wherein the second hydrocarbon feed is subjected to heating with the dehydration vapors at a temperature in the range of about 100° to 150° C.

4. A process of claim 2 wherein the hydrocarbon is a cycloalkane.

5. A process of claim 2 wherein the hydrocarbon is cyclohexane.

6. A process of claim 5 wherein the heat supplied to the reaction mixture by the feeds thereto is sufficient to carry forward the reaction with the requisite hydrocarbon and water boil-up.

7. A process of claim 6 wherein any non-hydrocarbon material present in the first hydrocarbon feed is in solution during the further heating thereof.

References Cited by the Examiner

UNITED STATES PATENTS

| | | | |
|---|---|---|---|
| 1,947,989 | 2/1934 | Hellthaler et al. | 260—462 XR |
| 3,109,864 | 11/1963 | Fox et al. | 260—462 XR |

OTHER REFERENCES

Bashkirov: Chem. Abstracts, 51, 4027 (1957).

CHARLES B. PARKER, *Primary Examiner.*

DELBERT R. PHILLIPS, *Assistant Examiner.*